US008371416B2

(12) United States Patent
Eick et al.

(10) Patent No.: US 8,371,416 B2
(45) Date of Patent: Feb. 12, 2013

(54) CONSTANT HOLDDOWN WEIGHT FOR VIBRATORY SEISMIC SOURCES

(75) Inventors: Peter M. Eick, Houston, TX (US); Joel D. Brewer, Houston, TX (US); Shan Shan, Houston, TX (US); Frank D. Janiszewski, Richmond, TX (US)

(73) Assignee: ConocoPhillips Company, Houston, TX (US)

(*) Notice: Subject to any disclaimer, the term of this patent is extended or adjusted under 35 U.S.C. 154(b) by 89 days.

(21) Appl. No.: 13/204,239

(22) Filed: Aug. 5, 2011

(65) Prior Publication Data

US 2012/0037444 A1 Feb. 16, 2012

Related U.S. Application Data

(60) Provisional application No. 61/372,740, filed on Aug. 11, 2010.

(51) Int. Cl.
*G01V 1/02* (2006.01)
*G01V 1/047* (2006.01)
*G01V 1/04* (2006.01)
*G01V 1/00* (2006.01)

(52) U.S. Cl. .................. 181/114; 181/121; 367/190

(58) Field of Classification Search ........... 181/114, 181/113, 121, 401, 400; 367/189, 190
See application file for complete search history.

(56) References Cited

U.S. PATENT DOCUMENTS

| | | | | |
|---|---|---|---|---|
| 2,688,124 A * | 8/1954 | Doty et al. | ...... | 367/41 |
| 3,024,861 A * | 3/1962 | Clynch | ...... | 181/114 |
| 3,073,659 A * | 1/1963 | Brown | ...... | 92/164 |
| 3,159,233 A * | 12/1964 | Clynch et al. | ...... | 181/119 |
| 3,209,322 A * | 9/1965 | Doty | ...... | 367/63 |
| 3,293,598 A * | 12/1966 | Brown et al. | ...... | 367/41 |
| 3,306,391 A * | 2/1967 | Bays | ...... | 181/114 |
| 3,860,087 A * | 1/1975 | Silverman | ...... | 181/117 |
| 3,929,206 A * | 12/1975 | Bedenbender et al. | ...... | 181/114 |
| 4,063,613 A * | 12/1977 | Silverman | ...... | 181/119 |
| 4,114,722 A * | 9/1978 | Weber et al. | ...... | 181/114 |
| 4,133,409 A * | 1/1979 | Mifsud et al. | ...... | 181/114 |
| 4,147,228 A * | 4/1979 | Bouyoucos | ...... | 181/119 |
| 4,184,144 A * | 1/1980 | Rickenbacker | ...... | 367/137 |
| 4,248,324 A * | 2/1981 | Mifsud | ...... | 181/121 |
| 4,492,285 A * | 1/1985 | Fair et al. | ...... | 181/114 |
| 4,519,053 A * | 5/1985 | Bedenbender | ...... | 367/190 |
| 4,692,912 A * | 9/1987 | Mueller et al. | ...... | 367/190 |
| 4,855,967 A * | 8/1989 | Sallas et al. | ...... | 367/190 |
| 4,899,321 A * | 2/1990 | Solanki | ...... | 367/48 |
| 4,959,818 A * | 9/1990 | Cole | ...... | 367/189 |
| 7,327,633 B2 * | 2/2008 | Bagaini | ...... | 367/45 |
| 8,274,862 B2 * | 9/2012 | Sallas | ...... | 367/189 |
| 2010/0199772 A1 * | 8/2010 | Bagaini | ...... | 73/648 |
| 2012/0037445 A1 * | 2/2012 | Eick et al. | ...... | 181/121 |

* cited by examiner

*Primary Examiner* — Edgardo San Martin
(74) *Attorney, Agent, or Firm* — ConocoPhillips Company

(57) ABSTRACT

The invention relates to maintaining constant holddown force on the vibrator baseplate during actuation. The invention described measures the weight on the point of locomotion verses the baseplate and dynamically adjusts the forces required to keep the holddown force on the baseplate constant.

6 Claims, 4 Drawing Sheets

CONSTANT HOLDDOWN WEIGHT FOR VIBRATORY SEISMIC SOURCES

CROSS-REFERENCE TO RELATED APPLICATIONS

This application is a non-provisional application which claims benefit under 35 USC §119(e) to U.S. Provisional Application Ser. No. 61/372,740 filed Aug. 11, 2010, "Constant Holddown Weight For Vibratory Seismic Sources," which is incorporated herein in its entirety.

STATEMENT REGARDING FEDERALLY SPONSORED RESEARCH OR DEVELOPMENT

None.

FIELD OF THE INVENTION

This invention relates to the acquisition of seismic data and especially to sweep-type vibratory sources that provide seismic energy into the ground and create reflections from subsurface geology that is received and recorded in the form of seismic data.

BACKGROUND OF THE INVENTION

Historically, the acquisition of seismic data was accomplished by creating an explosion that propagated a broad frequency spectrum of seismic energy into the ground. The energy carried down into the ground reflecting and refracting off and through the various strata below the surface and the returning wavefield was recorded. This type of seismic acquisition was slow and dangerous.

In the 1950's, Conoco developed sweep-type vibrators that reduced the energy intensity of the explosion by spreading the smaller energy over a longer period of time as shown in U.S. Pat. Nos. 2,688,124, 3,024,861, 3,073,659, 3,159,233, 3,209,322, and 3,293,598, etc., for example. This certainly improved safety while still providing a frequency spectrum of energy into the ground. Sweep-type vibrators have now been in common use for over 50 years. The seismic surveys accomplished with sweep-type seismic sources are reliable and consistent and, most importantly, are safer than taking explosives into the field. However, it has long been recognized that high frequency energy provides a level of detail in the seismic record that is highly desirable, but the intensity or amplitude of the high frequency energy in the data record has been less than desirable.

Conventional efforts to increase the recordable high frequency energy have been primarily focused on providing longer sweeps or to lengthen the proportion of the sweep time for which the higher frequency energy is delivered into the ground. As a sweep-type vibrator delivers the seismic energy into the ground, it records each sweep and computes an approximate ground force delivered into the ground for use by a feedback circuit to control the vibe. This ground force approximation is used in subsequent analysis in seismic data processing. Conventional vibrator technology uses a weighted-sum method to approximate the "ground force" during a sweep. In 1984, Sallas derived the weighted-sum method to approximate the true ground force. See J. J. Sallas, Seismic Vibrator Control and the Downgoing P-Wave, GEOPHYSICS 49(6) (1984) 732-40. The weighted-sum method assumes that a baseplate acts as a rigid body, and that a full coupling between the baseplate and the ground is achieved. Under these assumptions, the weighted-sum ground force is obtained by summing the weighted baseplate and reaction mass accelerations. The Sallas approximation or equation may be written as:

$$-F_g = M_r A_r + M_b A_b,$$

where $M_r$=Mass of the reaction mass (kg); $M_b$=Mass of the baseplate (kg); $A_r$=Reaction mass acceleration (m/s$^2$); $A_b$=Baseplate acceleration (m/s$^2$); and $F_g$=Compressive force exerted on the earth by the baseplate (N). This is normally reported as the ground force of the vibrator.

The dynamics of vibrator systems seems to inherently limit the power that is deliverable into the ground at high frequency. A low frequency is delivered by a longer, slower stroke of the reaction mass while a higher frequency stroke is fast and typically shorter in length. While the Sallas approximation indicates that a fast stroke of shorter length provides equal force to the ground, the absence of the higher frequency data in the data traces or records from the field could mean that either the true force is not what is approximated by the Sallas equation or that consistent force across a broad frequency spectrum does not deliver consistent energy delivery across a broad frequency spectrum.

BRIEF SUMMARY OF THE DISCLOSURE

The invention more particularly relates to an improved process for delivering a vibratory sweep signal into the ground for acquiring seismic data where a seismic vibrator vehicle is provided that carries a vibrator system with a lift mechanism to raise and lower the vibrator system where the vibrator system includes a baseplate and a baseplate drive system connected to the baseplate to move the baseplate up and down. At least one holddown weight sensing device is provided for sensing the weight of the vehicle on the baseplate when the baseplate is lowered to the ground. The baseplate is lowered to the ground using the lift mechanism to transfer a substantial portion of the weight of the vehicle to the baseplate and the vibrator system is operated to create a sweep of vibrations into the ground. The holddown weight on the baseplate is sensed during the sweep of vibrations and the lift mechanism is adjusted to substantially maintain the holddown weight on the baseplate to be substantially constant during the sweep.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
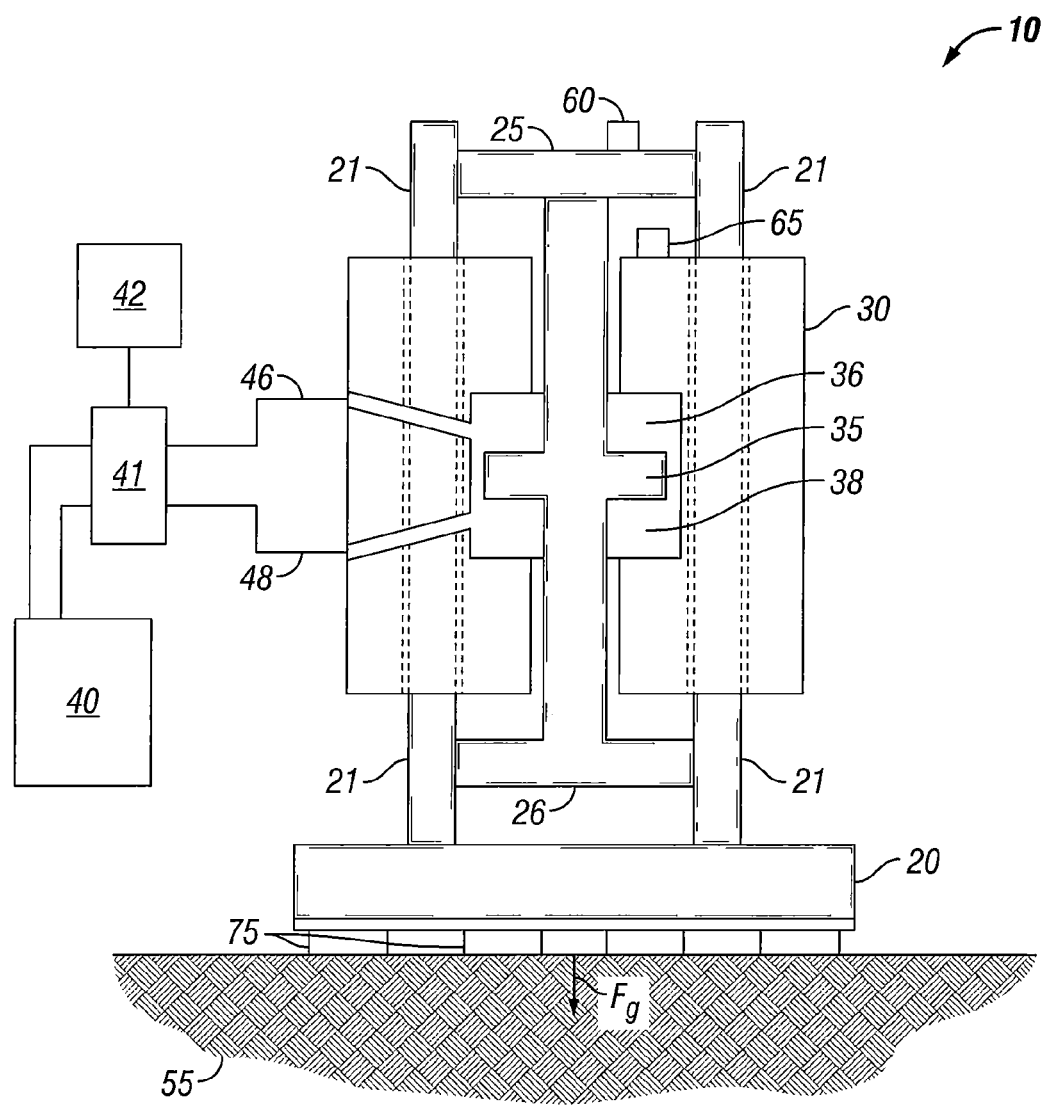
FIG. 1 is a cross-sectional view of a conventional seismic vibrator on an array of load sensors.

As noted above, it has been difficult to acquire suitable high frequency data when using sweep-type vibratory seismic sources and investigations pursuant to the present invention have turned toward an analysis of the energy that sweep-type vibratory seismic sources are actually putting into the ground in hopes of increasing the presence of high frequency data in the returning wavefield. The analysis begins with a seismic vibrator that one would plan to use in a seismic survey. For explaining the invention, a conventional sweep-type vibratory seismic source is illustrated in FIG. 1 and is now explained.

A simplified version of the operable portion of a conventional seismic vibrator is generally indicated by the arrow 10. The primary operative element is baseplate 20 that is lowered to the ground 55 and held down typically using the weight of the vehicle that carries vibrator 10. Typically, vibrator 10 is carried along under the belly of the vehicle and lowered to the ground once located at a shot point or source point. While the weight of the vehicle is used to hold the baseplate to the ground, it is typically isolated from the intense vibration by pneumatic dampeners that are not shown. The second operative element of the vibrator is reaction mass 30 that is positioned to slide up and down along guide rods 21. The reaction mass 30 is a heavy and substantial sized block of metal. The reaction mass 30 is intended to be forcefully moved up and down to create impulses that are passed into the ground 55 through baseplate 20.

The reaction mass 30 is driven up and down along guide rods 21 by a hydraulic system, schematically indicated by box 40, where hydraulic fluid is delivered through a valving system 41 and into and through channels 46 and 48. Upper and lower cylinders 36 and 38 are rapidly filled and drained of hydraulic fluid to drive the reaction mass 30 relative to piston 35. Vibe controller 42 controls the valving system 41 thereby controlling the speed and direction of the reaction mass and ultimately the frequency and force at which the reaction mass moves. The hydraulic system 40 typically includes a diesel powered hydraulic pump. As noted above, this is the basic arrangement of a conventional sweep-type vibrator. A baseplate accelerometer 60 measures the acceleration of the baseplate 20 while a reaction mass accelerometer 65 is mounted on the reaction mass 30 to record the acceleration of the reaction mass 30.

Continuing with the discussion of the analysis of the seismic source, the vibrator 10 is operated to generate seismic energy, but using one or more load sensors between the baseplate 20 and the ground. As shown in FIG. 1, an array of load sensors 75 are placed under the baseplate 20 to more accurately measure the true ground force produced at each frequency to determine the actual ground force ($F_g$) applied to the earth over a range of frequencies. Load sensors are described in the publication "Load Cell System Test Experience: Measuring the Vibrator Ground Force on Land Seismic Acquisition", Shan, S., et al. *SEG Expanded Abstracts,* 0016-0020 (October 2009). Although it is known that vibes provide a ground source estimate that is used for inversion and subsequent data processing, it turns out that current vibrators do not provide accurate information about the ground force actually delivered to the ground. The load sensors provide more accurate data and this has been confirmed by experiments using seismic receivers installed in boreholes deep in the ground. It should be emphasized that these experiments confirmed two important observations. First, the vibrators do not actually impart the ground force to the earth they report based on the ground force data computed by the vibrator controller based on the Sallas estimation, especially at higher frequencies. And secondly, the load sensors provide a relatively accurate ground force measurements across the frequency spectrum.

The information provided by the vibrator controller are sufficiently accurate at lower frequencies, but inaccuracy begins at about 35 Hz and continues to deviate as the frequency being delivered gets higher. The actually becomes unacceptable under most conventional ground conditions at frequencies of about 40 to 50 Hz in the sweep for most terrains using industry standard 60,000+ lbs vibrators. Specifically, most large industry standard seismic vibrators begin to reduce the actual ground force at about 35 Hz (as compared to what the vibrator actually reports via the vibe controller and the Sallas Approximation), and the ground force is quite variable above about 40 to 50 Hz. Much above 60 Hz and the forces in the sweeps are highly unstable and do not reflect the signal that is desired to be imparted to the ground and as reported by either the load cell data nor the data from the receivers in the well bore. In more simple and brutal terms, the vibe reports it is doing the sweep nearly perfectly and it is actually doing a terrible job putting the sweep into the ground. Essentially, the vibrators "lie" about how good of a job they are doing.

In a preferred embodiment, the true ground force imparted to the earth from a seismic vibrator is recorded using a load sensor device or an array of load sensor devices. The seismic vibrator controller electronics 42 is supplied a pilot sweep that represents the desired source signature. The pilot sweep is a sinusoidal function that varies in frequency with time. It is used by the valving system 41 as a representation for the desired motion of the baseplate 20 and reaction mass 30. The motion of the baseplate 20 is then translated into ground force through impulses with the earth. Ground force is actually weight that varies in time in a similar manner to the way the pilot sweep's sinusoidal shape varies in time. The ground force measured by the array of load sensors and the pilot sweep are then directly related and are also directly related to the desired true ground force.

Figure 2:
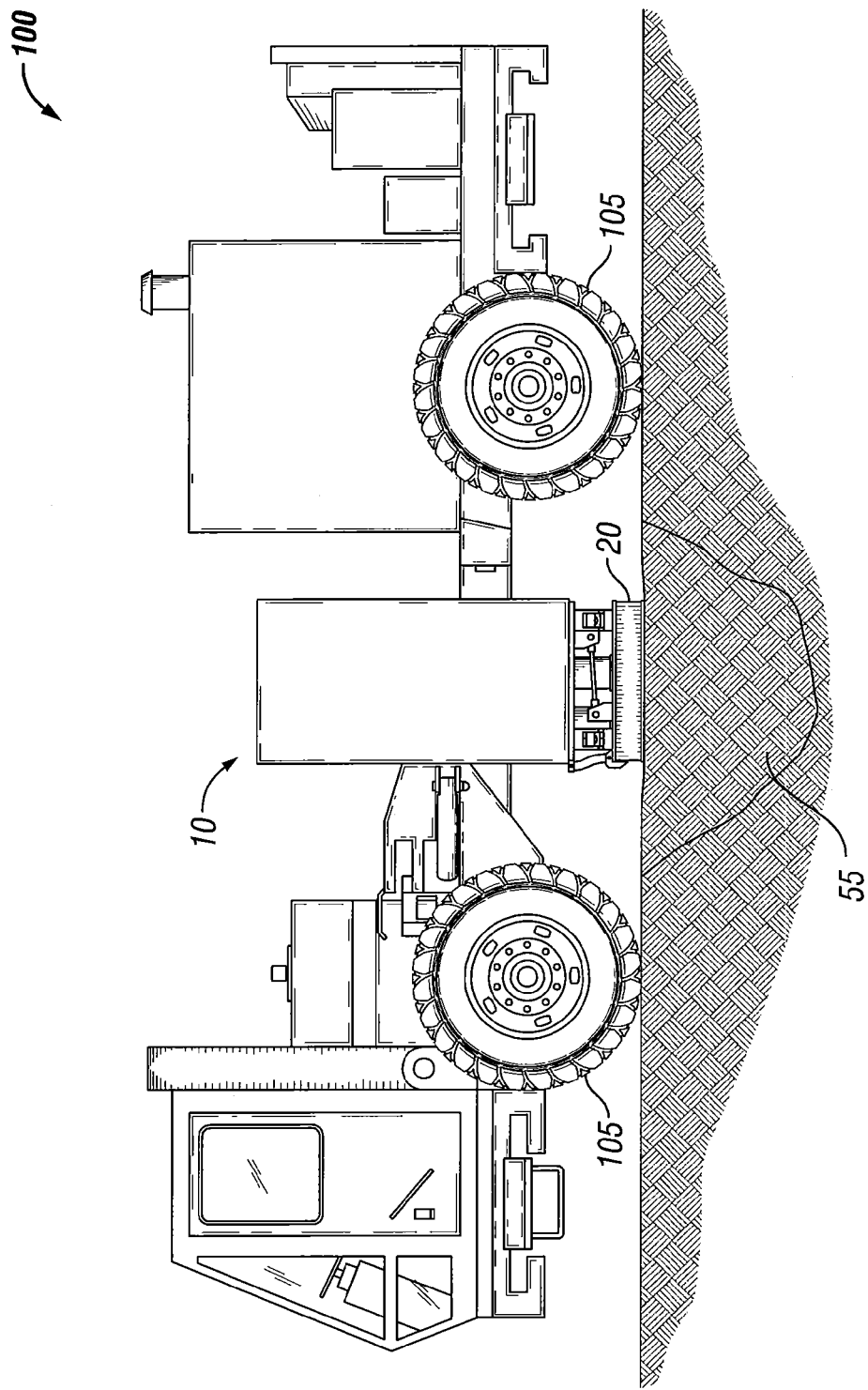
FIG. 2 is a diagram of a conventional seismic vibrator vehicle.

In the analysis of the present invention, it was observed that when the baseplate is lowered to the ground by a lift mechanism, the weight of the vehicle is applied to the vibrator 10 although the wheels of the vehicle are not lifted off the ground to reduce flexing of the chassis of the vehicle. Referring to FIG. 2, the vehicle is indicated by the arrow 100 with the vibrator 10 located in the middle of the chassis (not numbered). The baseplate 20 is carried along by the vehicle 100 at its belly with the baseplate lifted off the ground for transport. When the baseplate 20 is over a shot point or source point for the survey the lift mechanism then lowers the vibrator 10 to the ground 55 so that the baseplate is in firm contact with it. The lift mechanism is conventional and includes a conventional pneumatic dampening system to insulate the vehicle 100 from the energy and vibrations of the vibrators when delivering a sweep into the ground 55. During the early part of the first sweep at the shot point, the baseplate 20 tends to pound itself down into the ground usually some distance so that more weight of the vibe is effectively transferred to the tires 105. With less holddown weight on the vibrator, the energy being delivered to the ground 55 is compromised.

Figure 3:
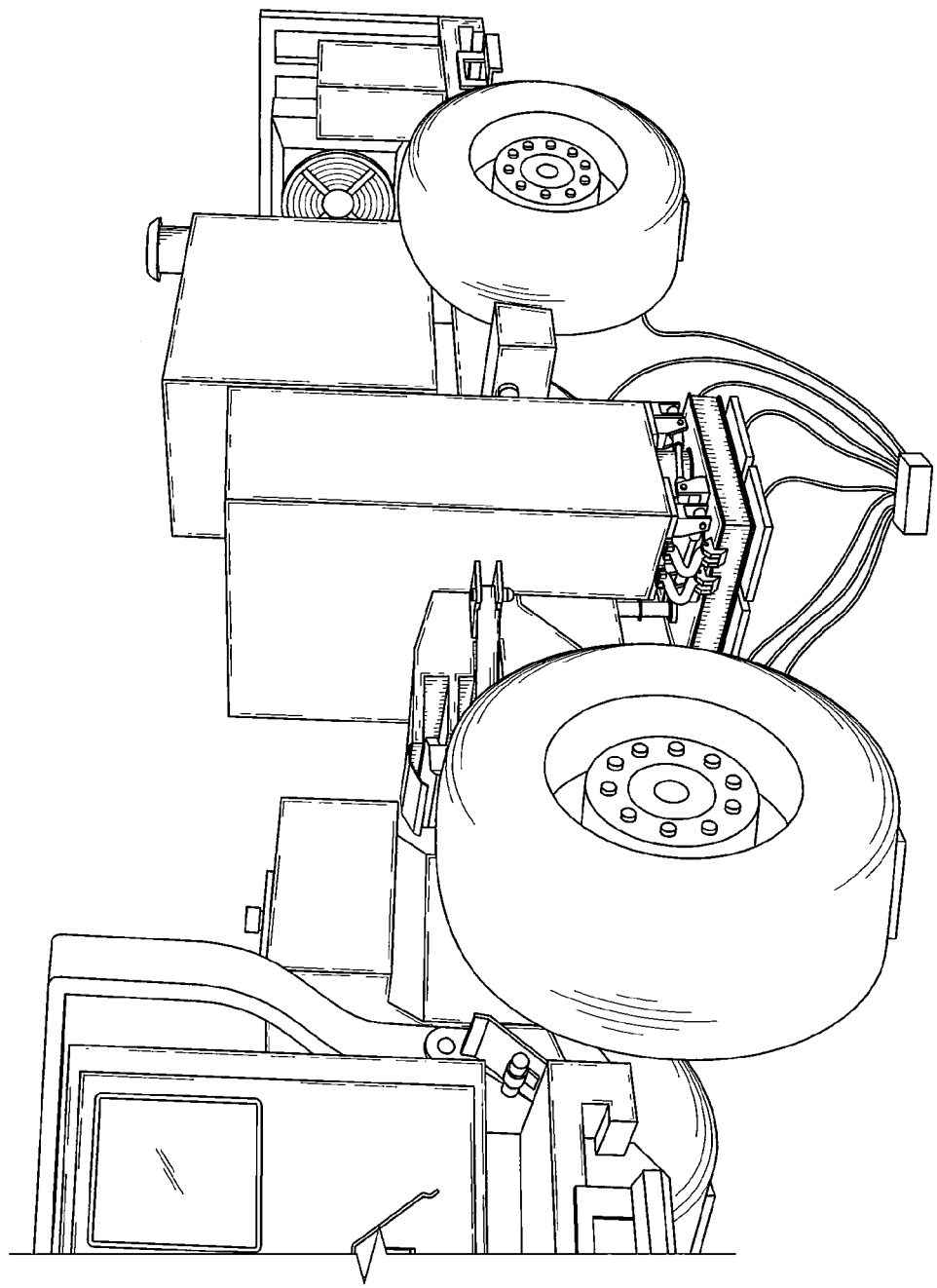
FIG. 3 is an image of a conventional vibrator with the weight of the vehicle wheels biased onto the baseplate for delivering a sweep of seismic energy into the ground.
Figure 4:
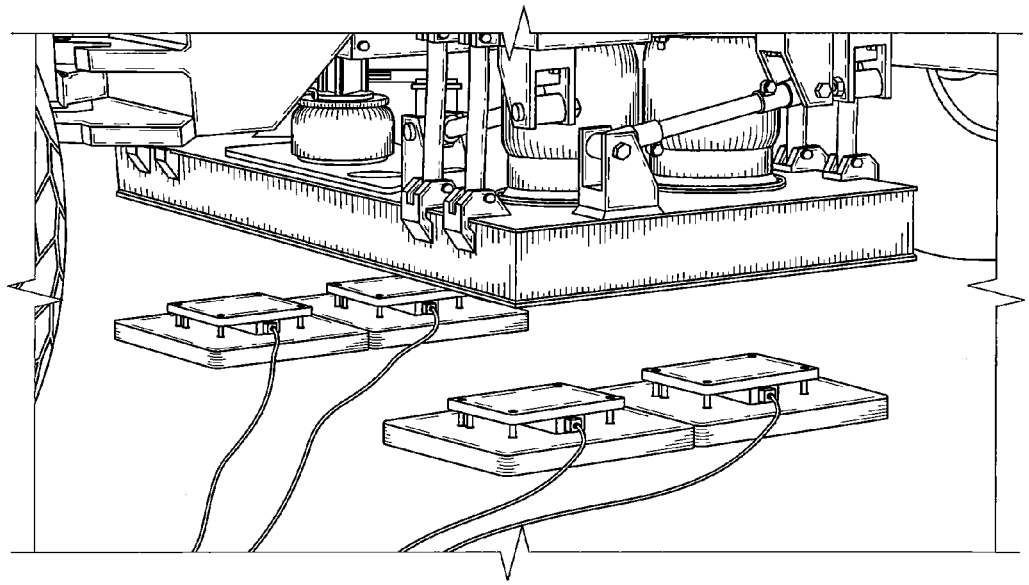
FIG. 4 is an image of four load sensors on the ground under the baseplate to measure the ground force applied to the ground through the baseplate.
Figure 5:
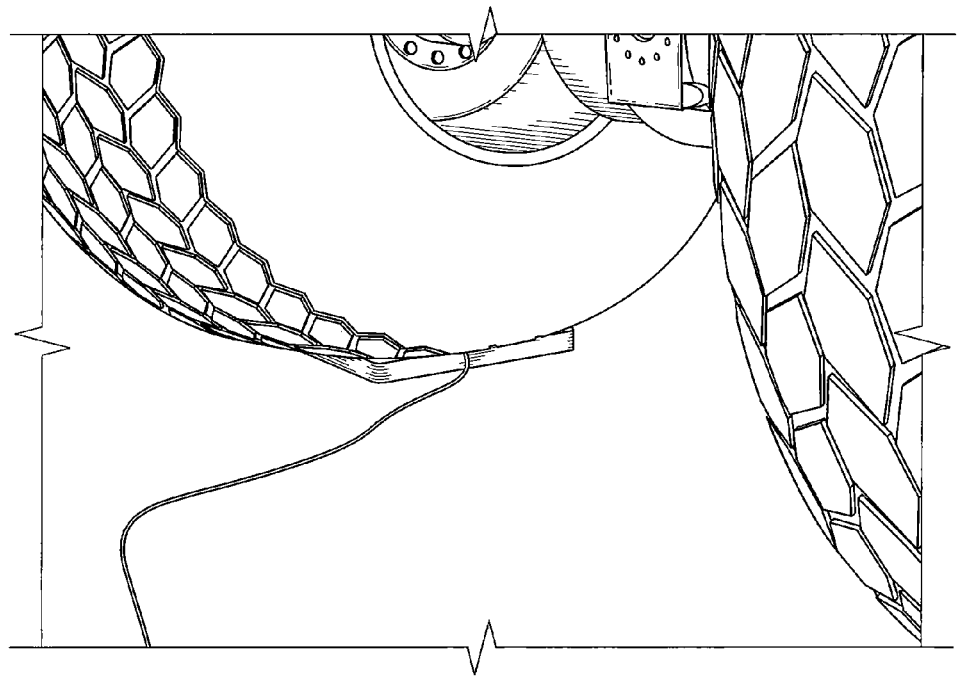
FIG. 5 is an image of a tire of a vibrator vehicle with a load sensor underneath to measure weight transfer during a sweep.

Testing using the load cells 75 in FIG. 1 confirmed that the signal diminishes as the holddown weight reduces. This was shown by over-pressuring the lift mechanism so the vibe was completely suspended in the air and then shook so that at no time did the weight offload to the tires. During these tests the vibe performance improved at the higher frequencies. FIG. 3 is an image showing this experiment. FIG. 4 shows four load sensors placed under the vibe for field testing of the measured sweeps. At the same time, FIG. 5 shows how additional load sensors were placed under the wheels of the vibe to measure the transfer of holddown force from the vibrator 10 to the tires 105 when in contact with the ground.

The present invention relates to a sensing circuit that senses the weight on the tires 105 or holddown weight on the baseplate 20 and actuates the lift mechanism to adjust the holddown weight or to maintain the holddown weight on the vibrator to be constant during and through the sweeps. In FIG. 2, the baseplate 20 is shown pressed deeper into the ground 55 although the ground may have been perfectly flat before the first sweep was delivered. Without adjusting the holddown weight by actuating the lift mechanism to lift much of the weight of the vehicle off of the tires 105, the signal is compromised and diminished. The deflection of the ground 55 tends to occur most severely during low frequency portions of the sweep so in an upsweep, the holddown weight is reduced prior to delivering the high frequency signal.

Note that while wheeled vibrators are shown, this invention is applicable for tracked vibrators, truck mounted vibes or other vehicles and other forms of locomotion. They salient point is to maintain the holddown force on the baseplate as a constant force and not allow the weight transfer to the contact patch of the method of locomotion. "Substantially constant" is intended to mean that the weight on the baseplate is maintained to be within fifteen percent at the end of the sweep compared to the beginning of the sweep. More preferably, "substantially constant" means maintaining the weight on the baseplate to be within ten percent at the end compared to the start and more preferably to be within five percent. A system may be configured to maintain the end of sweep weight on the baseplate to be within two percent or within about one percent.

In the preferred embodiment of the invention, the support structures for the four wheels 105 are fitted with load sensors. The load sensor data is utilized by an electronic control system that will then create a feed back loop with the seismic vibrator controller electronics 42, valving system 41 and hydraulic system 40. The result will be the adjustment of the holddown force by the lift mechanism of the vibrator so that a constant holddown force is applied.

In an alternate embodiment of the invention load sensors are placed at attachment points of the baseplate 20 to the guide rods 21 so that all contact force is measured between the vibrator vehicle 100, associated vibrator 10 and the vibrator baseplate 20. The load sensor data will be utilized by an electronic control system that will then create a feed back loop with the seismic vibrator controller electronics 42, valving system 41 and hydraulic system 40. The result will be the adjustment of the holddown force by the lift mechanism of the vibrator so that a constant holddown force is applied.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. An improved process for delivering a vibratory sweep signal into the ground for acquiring seismic data where the process comprises:
    (a) providing a seismic vibrator vehicle carrying a vibrator system with a lift mechanism to raise and lower the vibrator system where the vibrator system includes a baseplate and a baseplate drive system connected to the baseplate to move the baseplate up and down;
    (b) providing at least one holddown weight sensing device for sensing the weight of the vehicle on the baseplate when the baseplate is lowered to the ground;
    (c) lowering the baseplate to the ground using the lift mechanism to transfer a substantial portion of the weight of the vehicle to the baseplate;
    (d) operating the vibrator system to create a sweep of vibrations into the ground;
    (e) sensing the holddown weight on the baseplate during the sweep of vibrations; and
    (f) adjusting the lift mechanism to substantially maintain the holddown weight on the baseplate to be substantially constant during the sweep.

2. The process according to claim 1 wherein the vehicle has wheels and the lift mechanism is adjusted to maintain some of the weight of the vehicle on the wheels.

3. The process according to claim 2 wherein two of the vehicle wheels have the sensors and the lift mechanism is adjusted to maintain some of the weight of the vehicle on the wheels.

4. The process according to claim 2 wherein three of the vehicle wheels have the sensors and the lift mechanism is adjusted to maintain some of the weight of the vehicle on the wheels.

5. The process according to claim 2 wherein all of the vehicle wheels have the sensors and the lift mechanism is adjusted to maintain some of the weight of the vehicle on the wheels.

6. The process according to claim 1 wherein a sensor is provided with the lift mechanism and the process includes maintaining constant pressure on the lift mechanism.

* * * * *